US011475702B2

(12) United States Patent
Trouboul

(10) Patent No.: US 11,475,702 B2
(45) Date of Patent: Oct. 18, 2022

(54) THIN SHEET PAPILLARY PRINT SENSOR

(71) Applicant: Idemia Identity & Security France, Courbevoie (FR)

(72) Inventor: Laurent Trouboul, Courbevoie (FR)

(73) Assignee: IDEMIA IDENTITY & SECURITY FRANCE, Courbevoie (FR)

( * ) Notice: Subject to any disclaimer, the term of this patent is extended or adjusted under 35 U.S.C. 154(b) by 371 days.

(21) Appl. No.: 16/856,163

(22) Filed: Apr. 23, 2020

(65) Prior Publication Data
US 2020/0342198 A1    Oct. 29, 2020

(30) Foreign Application Priority Data
Apr. 25, 2019 (FR) ........................... 1904371

(51) Int. Cl.
*G06K 9/00* (2022.01)
*G06V 40/13* (2022.01)
(52) U.S. Cl.
CPC .................. *G06V 40/1324* (2022.01)
(58) Field of Classification Search
CPC ........... G06K 9/00046; G06V 40/1324; G06V 40/1318; G06V 40/1335; G02B 17/086; G02B 27/58; G02B 5/005; G02B 5/1857
See application file for complete search history.

(56) References Cited

U.S. PATENT DOCUMENTS

| 5,077,803 A | * | 12/1991 | Kato | ......................... G07C 9/37 356/71 |
| 6,011,860 A | * | 1/2000 | Fujieda | ................ A61B 5/1172 382/126 |

FOREIGN PATENT DOCUMENTS

FR    2890208 A1    3/2007

OTHER PUBLICATIONS

Igaki, S. et al., "Real-time fingerprint sensor using a hologram," Applied Optics, Optical Society of America, dated Apr. 10, 1992, vol. 31, Issue 11, pp. 1794-1802.

(Continued)

*Primary Examiner* — Michael J Vanchy, Jr.
(74) *Attorney, Agent, or Firm* — Womble Bond Dickinson (US) LLP

(57) ABSTRACT

The invention relates to a papillary print sensor comprising an acquisition surface (14) extending over a length L, a light source (11) configured to emit a light pulse, a sheet (12) adapted to propagate light rays by reflection on the first face (12a) and the second face (12b), which defines a critical angle ($\theta_c$), and an imager (13), wherein the thickness (e) of the sheet is less than a thickness $e_{max}=L/2\times\tan(\theta_c)$, such that a first part of the light rays (20b, 20c) is propagated without reflection on the acquisition surface (14) while a second part of the light rays (20a, 20d) is reflected towards said acquisition surface (14) after reflection on the second face (12), and the imager (13) is configured to acquire a first image during the reception of the first part of the light rays and a second image during the reception of the second part of the light rays.

10 Claims, 3 Drawing Sheets

(56) References Cited

OTHER PUBLICATIONS

Correspondence from the French National Institute of Industrial Property Office (INPI—Institute National De La Propriété Industrielle) for FR1904371 dated Mar. 19, 2020; Preliminary Research Report of the French National Institute of Industrial Property Office for FR1904371 dated Mar. 13, 2020; and Written Opinion on the Patentability of the Invention issued by the French National Institute of Industrial Property Office for FR1904371.

English machine translation of Correspondence from the French National Institute of Industrial Property Office (INPI—Institute National De La Propriété Industrielle) for FR1904371 dated Mar. 19, 2020; Preliminary Research Report of the French National Institute of Industrial Property Office for FR1904371 dated Mar. 13, 2020; and Written Opinion on the Patentability of the Invention issued by the French National Institute of Industrial Property Office for FR1904371.

* cited by examiner

[FIG. 3]
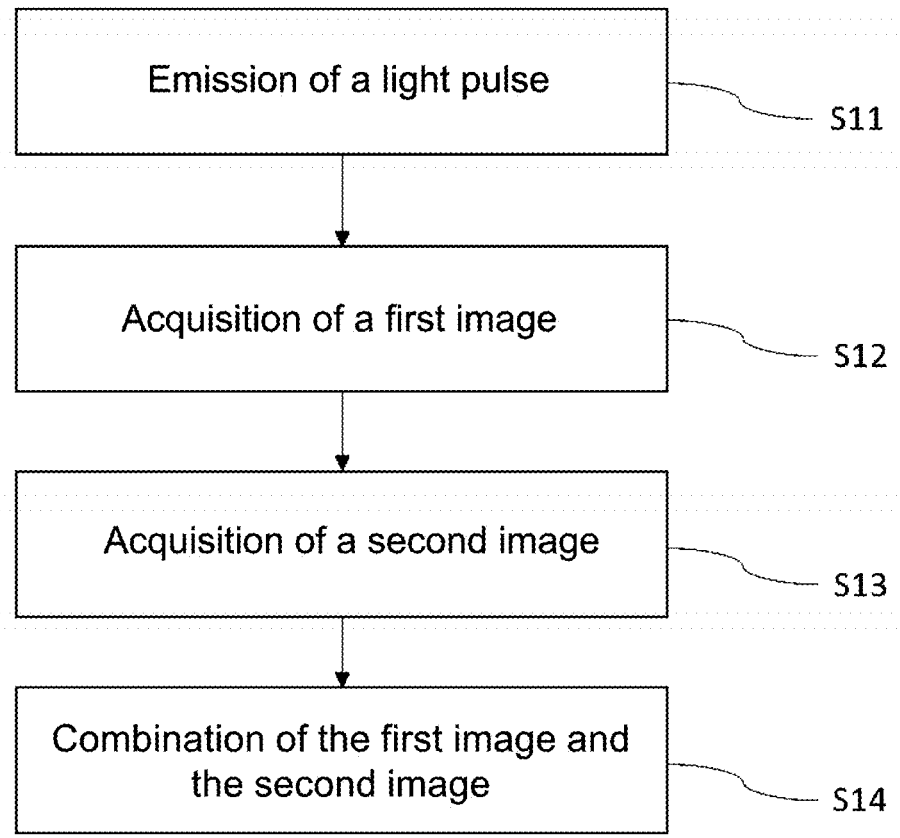
[FIG. 4]
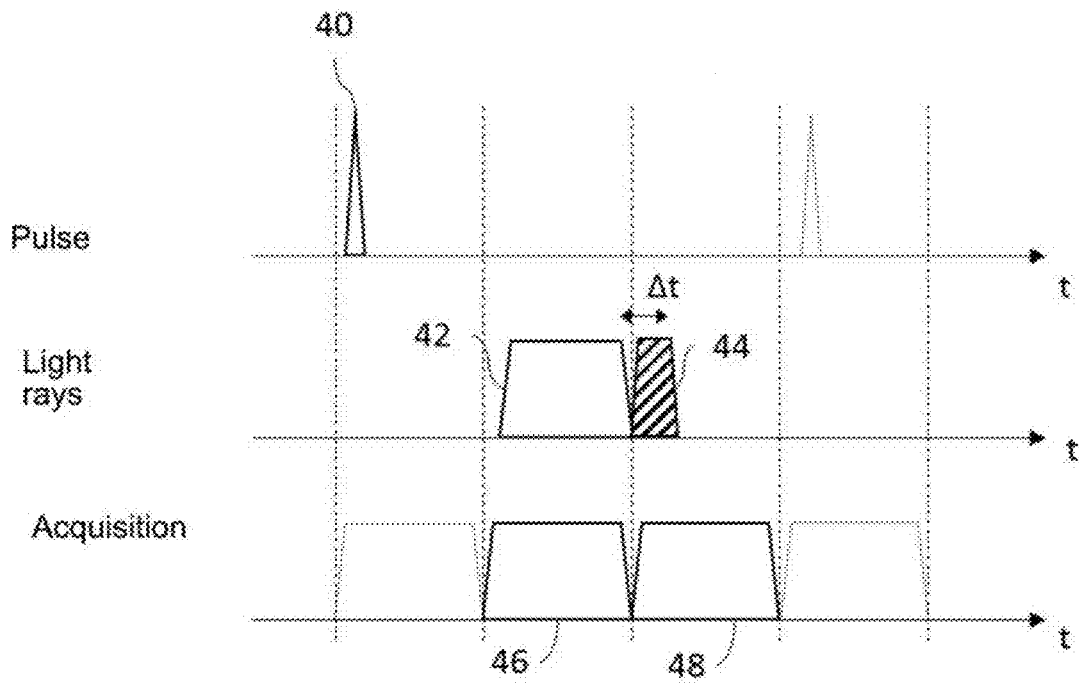

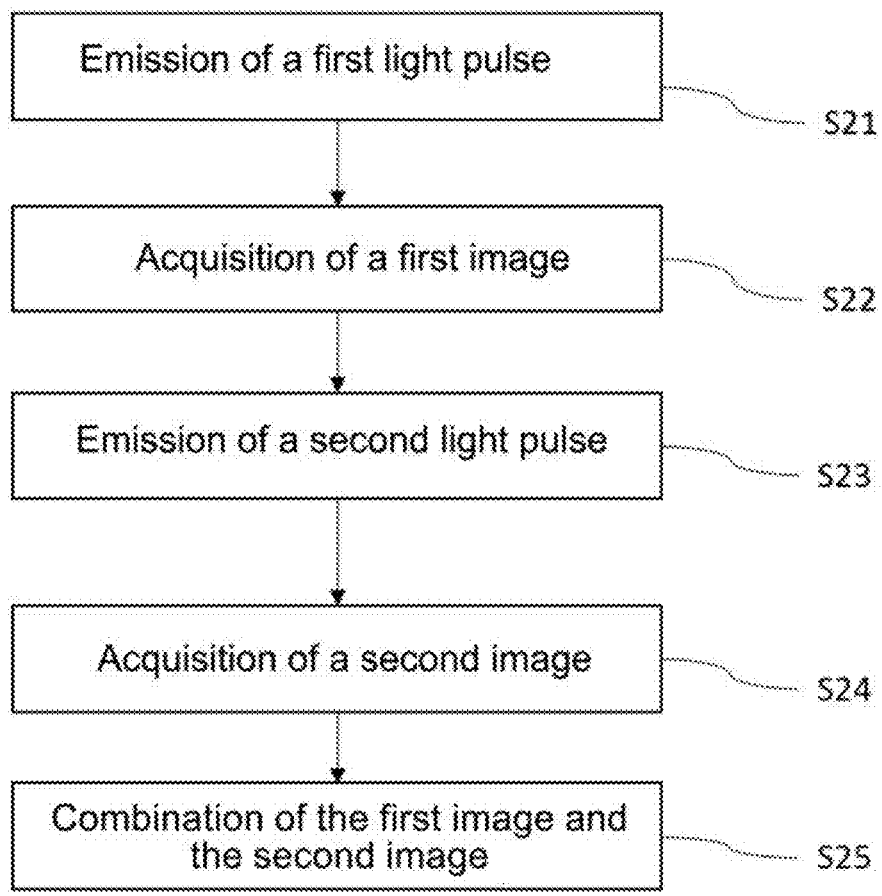
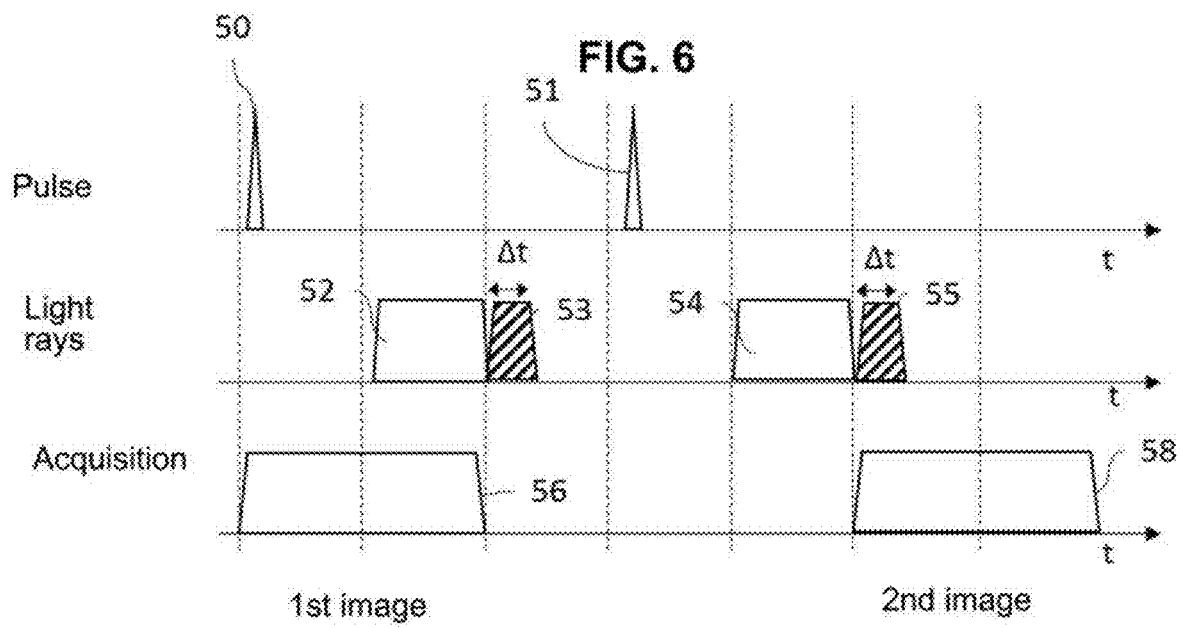

THIN SHEET PAPILLARY PRINT SENSOR

TECHNICAL FIELD

The invention relates to a papillary print sensor, such as a thin sheet fingerprint sensor, and a method of operating the same.

STATE OF THE ART

Papillary prints identification is one of the most widely used techniques in biometrics. Papillary prints are formed by dermatoglyphs present on the epidermis at the surface of the skin. These dermatoglyphs consist of ridges and valleys, and are a projection of the pattern present in depth on the dermis. Dermatoglyphs have the advantage of being individual, immutable and unalterable, unless the dermis is deeply damaged.

The parts of the human body exhibiting papillary prints consist mainly of the fingers, and are then referred to as fingerprints, but they are also present on the palms or soles of the feet. There are several possible technologies for acquiring papillary prints for identification purposes. The acquisition of an optical image of the fingerprints of a finger is the most commonly used and will be used to illustrate the present invention. The term "finger" will therefore be used hereinafter to designate the part of the human body having papillary prints, and "fingerprints" to designate papillary prints.

In an optical identification by fingerprints, an image of an illuminated finger is acquired and analyzed to identify an individual. The most commonly used method consists of acquiring the image of the finger when it is placed on a surface, and exploiting the optical interactions between the finger and that surface to identify the fingerprints, and by comparison with a database, to identify the individual.

A fingerprint sensor which must illuminate a finger and recover the light therefrom in order to process it therefore uses optical systems in order to acquire the biometric data which must be processed. The optical systems used give rise to geometrical constraints related to the propagation of light rays which result in bulk and manufacturing constraints.

For example, FIG. 1 illustrates a schematic example of a fingerprint sensor 1 wherein the propagation of light between the acquisition surface 4 and the imager 3 involves several reflections at interfaces between a propagation medium and media external to this propagation medium, typically air.

The sensor 1 comprises a sheet 2 forming a propagation medium for light, in a transparent material such as e.g. polymethyl methacrylate (PMMA). The sheet 2 comprises two substantially parallel faces 2a, 2b which are intended to reflect the light rays, forming a waveguide up to the imager 3 in a propagation direction Z. The interface between the propagation medium and the external medium in contact with each of these faces 2a, 2b defines a critical angle. When the angle of incidence of the light is less than the critical angle, the light passes through the interface; when the angle of incidence of the light is greater than the critical angle, the light is reflected at the interface without passing through it. To simplify, it is considered herein that the external medium is air for both faces 2a, 2b, except at the level of the acquisition surface.

The sheet 2 has, in fact, opposite to the second face 2b, an acquisition surface 4 intended to receive in affixation the finger having the fingerprints from which it is desired to acquire an image. The acquisition surface 4 is typically a part of the first face 2a of the sheet 2.

Fingerprints consist of ridges and valleys. The ridges are in contact with the acquisition surface 4, defining together with the propagation medium a skin propagation medium interface. The valleys are not in contact with the acquisition surface, air is interposed between the skin forming the valleys and the acquisition surface 4. In the absence of ridges, there is therefore an air propagation medium interface. These interfaces thus define different critical angles of reflection, which depend on the respective refractive indexes of the skin and air propagation medium.

A light source 1, for example a light-emitting diode, emits light in the direction of the part of a body placed on the acquisition surface 4. The light may be reflected by the interface between the acquisition surface 4 and the air, in which case it is reflected from the acquisition surface 4 towards the inside of the sheet 2, or the light may reach the finger and be re-emitted by diffusion into the propagation medium by passing through the acquisition surface 4. The light coming from the acquisition surface 4 matches the image whose acquisition is desired.

The light rays coming from the acquisition surface 4 are propagated in the propagation medium of the sheet 2 until they reach the second face 2b of the sheet opposite to the acquisition surface 4. The light rays, which have an angle of incidence θ on the second face 2b greater than the critical angle, are reflected towards the inside of the sheet 2 in the direction of the first face 2a, while the other light rays pass through the second face 2b and leave the sheet 2. The reflected light rays are then propagated by total internal reflection, reflecting alternately on the first face 2a and the second face 2b, until they reach the outlet 5 of the sheet, then the imager 3. Typically, as schematically shown in FIG. 1, the outlet 5 of the sheet may be curved, and one or more mirrors 6 may be used between the outlet 5 and the imager 3 to guide the light.

This propagation by total internal reflection in the sheet 2 imposes a restriction on the thickness of the sheet. In fact, it is necessary for the sheet 2 to have a sufficient thickness e to prevent the light rays reflected on the second face 2b from reaching the acquisition surface 4, in order to prevent the creation of ghost images. If rays coming from a first point of the acquisition surface 4 are reflected back on the second face 2b towards another point of this acquisition surface 4, these rays can be reflected by the acquisition surface 4 towards the inside of the sheet 2 and propagate towards the imager 3. A single point on the acquisition surface 4 can then be the source of two types of light rays: first light rays without prior reflection, matching the image which it is desired to be acquired, and second light rays which have previously undergone a reflection on the second face. These two types of rays generate two different light data for the same point: a real image and a ghost image, which end up polluting the real image.

The rays most likely to create such ghost images are those coming from the side of the acquisition surface 4 the furthest away from the outlet 5 in the direction of propagation Z, opposite to the imager 3. In a cross sectional view, as shown in FIG. 1, the acquisition surface 4 extends over the first face 2a in the direction of propagation Z from a point A to a point B, point A being the point of the acquisition surface 4 furthest from the outlet 5, point B being the point of the acquisition surface 4 closest to the outlet 5 of the sheet 2. The light rays coming from point A, incident on the second face 2b at an angle of incidence θ greater than the critical angle, are reflected back with the same angle θ towards the first face 2a. In order for these rays to avoid the acquisition surface 4 even with an angle of incidence θ equal to the critical angle, it is necessary for the thickness e of the sheet to be greater than a minimum thickness $e_{min}$ corresponding to $e_{min}=L/2\times\tan(\theta_c)$, where L is the width of the acquisition surface 4 in the direction of propagation Z (i.e. the distance between A and B) and $\theta_c$ is the critical angle at the interface between the second face 2b and the external medium. For example, with PMMA as propagation medium (refractive index $n_{medium}$ of 1.42), the critical angle $\theta_c$ is about 42°. An acquisition surface 4 extending over a width L of 20 mm in the direction of propagation Z then imposes a sheet thickness of at least 9 mm.

A thick sheet 2 presents several disadvantages. Firstly, the thickness of the sheet 2 prevents a thinner and less bulky sensor 1 from being produced. Subsequently, it is difficult to manufacture a thick sheet 2, and in particular to ensure a perfect flatness of the sheet 2, which is necessary for a good propagation of light by total reflection.

BRIEF DESCRIPTION OF THE INVENTION

The invention aims at allowing to reduce the bulkiness of the sensor and to facilitate its manufacture by proposing a sensor provided with a sheet of reduced thickness, which nonetheless makes it possible to acquire an image of the fingerprints which is not affected by a ghost image.

To this end, the invention proposes a papillary print sensor comprising:
  an acquisition surface intended to receive a part of a body from which an image of the papillary prints must be acquired, the acquisition surface extending over a length L in a propagation direction,
  a light source configured to emit a light pulse in the direction of the part of a body placed on the acquisition surface,
  a sheet forming a propagation medium for the light in the propagation direction having a first refractive index, and having at least one outlet, a first face and a second face parallel to each other and spaced apart by a thickness of the sheet, the sheet being adapted for the propagation of light rays from the acquisition surface to the outlet by reflection on the first face and the second face, the second face constituting an interface between the sheet and a medium external to the sheet having a second refractive index different from the first refractive index, said interface defining a critical angle for the rays being propagated in the sheet and incident on this interface,
  an imager arranged for receiving light rays coming from the outlet, the imager comprising a matrix of pixels sensitive to the reception of the light rays during an acquisition time,
wherein the thickness of the sheet is strictly less than a limit thickness $e_{max}$, where $e_{max}=L/2\times\tan(\theta_c)$, such that in use a first part of the light rays is propagated from the acquisition surface to the outlet without reflection on the acquisition surface, while a second part of the light rays coming from the acquisition surface is reflected towards said acquisition surface after reflection on the second face when propagating from the acquisition surface to the outlet, and wherein the imager is configured to acquire a first image during a first acquisition time corresponding to the reception of the first part of the light rays and a second image during a second acquisition time corresponding to the reception of the second part of the light rays.

The invention also relates to a method for acquiring papillary prints of a part of a body placed on an acquisition surface of a papillary print sensor according to the invention, the method comprising the following steps:
  emission by the light source of a light pulse in the direction of the part of a body placed on the acquisition surface,
  acquisition by the imager of a first image during a first acquisition time corresponding to the reception of the first part of the light rays, said first part of the light rays being propagated from the acquisition surface to the outlet without reflection on the acquisition surface,
  acquisition by the imager of a second image during a second acquisition time corresponding to the reception of the second part of the light rays, said second part of the light rays coming from the acquisition surface being reflected towards said acquisition surface after reflection on the second face during propagation from the acquisition surface to the outlet,
  combination of the first image and the second image to form a final image representative of the papillary prints of the part of the body placed on the acquisition surface.

The sensor and/or the method may be advantageously supplemented by the following characteristics, taken alone or in any one of the technically possible combinations thereof:
  the first acquisition time stops before the beginning of the reception of the second part of the light rays, and the second acquisition time begins after the end of the reception of the first part of the light rays;
  the first acquisition time begins before the beginning of the reception of the first part of the light rays and the second acquisition time begins after the end of the reception of the second part of the light rays;
  the thickness of the sheet is greater than $e_{min}$, where $e_{min}=L/4\times\tan(\theta_c)$;
  at least one of the acquisition times between the first acquisition time and the second acquisition time is less than 500 picoseconds;
  the imager is an avalanche photodiode imager;
  the light pulse is less than 50 picoseconds;
  the combination of the first image and the second image consists of juxtaposing the first image and the second image;
  there may be an emission by the light source of a second light pulse in the direction of the part of a body placed on the acquisition surface after the imager has acquired a first image and before the imager has acquired a second image.

DESCRIPTION OF THE FIGURES

The invention will be better understood through the description below, which relates to embodiments and variants according to the present invention, given as non-limiting examples and explained with reference to the attached schematic drawings, in which:

FIG. 3 is a diagram illustrating the implementation of steps in the operation of a sensor according to a possible embodiment of the invention, FIG. 4 is a timing diagram illustrating the operation of a sensor according to a possible embodiment of the invention, FIG. 5 is a diagram illustrating the implementation of steps in the operation of a sensor according to a possible embodiment of the invention, FIG. 6 is a timing diagram illustrating the operation of a sensor according to a possible embodiment of the invention.

DETAILED DESCRIPTION

Figure 1:
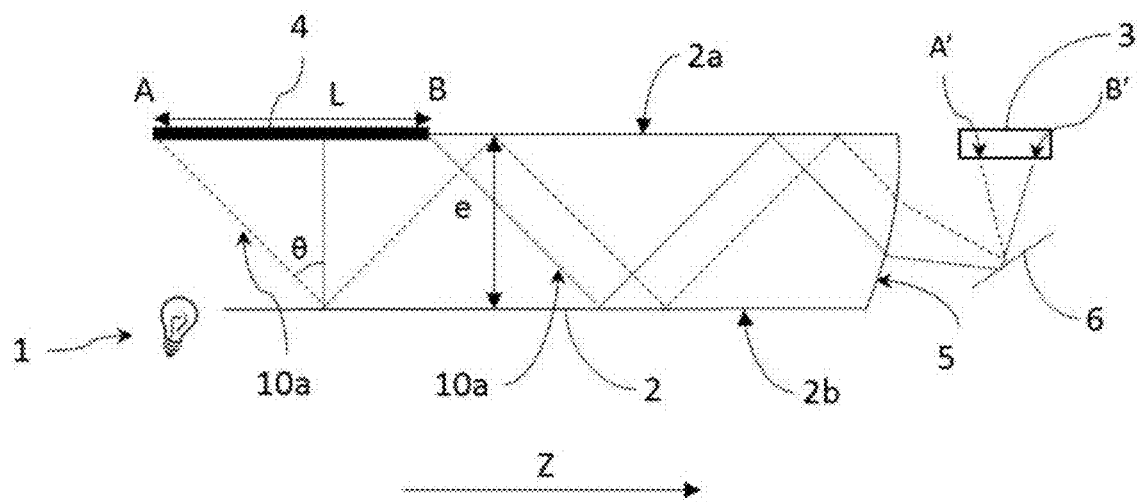
FIG. 1, already discussed, schematically illustrates an example of a cross sectional view of the structure of a sensor according to the state of the art, FIG. 2 schematically illustrates an example of a cross sectional view of the structure of a sensor according to a possible embodiment of the invention.
Figure 2:
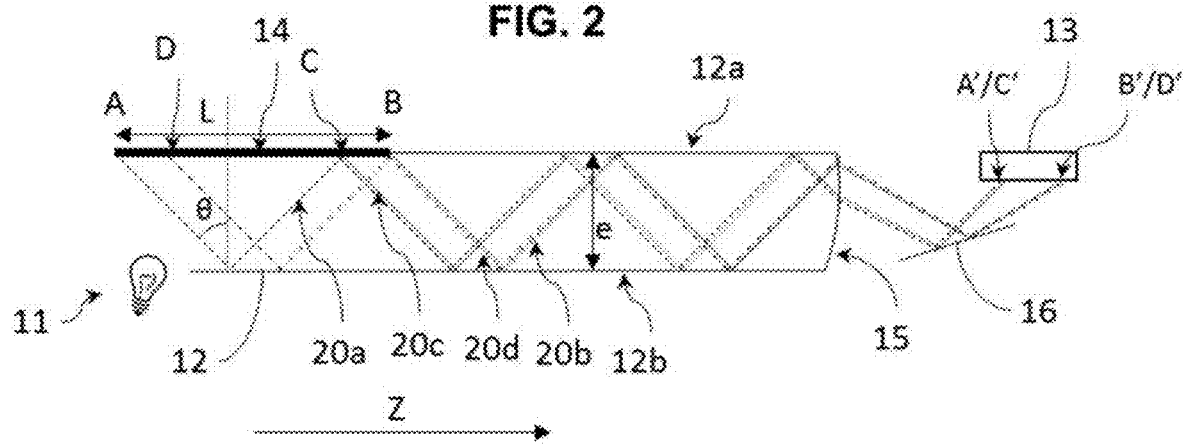

FIG. 2 shows an example of a papillary print sensor according to the invention having a structure similar to that disclosed with reference to FIG. 1. As a result, the characteristics disclosed in relation to the sensor of FIG. 1 also apply to a sensor according to the invention, unless explicitly mentioned otherwise. There is thus a sheet 12 forming a propagation medium for the light in the propagation direction Z having a first refractive index. The sheet 2 is made of a transparent material such as, for example, polymethyl methacrylate (PMMA). The sheet 2 has at least one outlet 15, a first face 12a and a second face 12b parallel to each other and spaced apart by a thickness e of the sheet 12. The sheet 12 may be of any shape provided that it fulfills a waveguide function for the light rays.

The sensor comprises an acquisition surface 14 intended to receive a part of a body from which an image of the papillary prints is to be acquired, i. e. intended to receive in affixation the finger presenting the fingerprints from which an image it is desired to be acquired. The sensor may be a fixed-finger sensor, in which the finger is stationary on the acquisition surface 14, or a rolling sensor, in which the finger moves in translation on the acquisition surface 14.

The acquisition surface 14 extends over a length L in a propagation direction Z. The acquisition surface 14 faces the second face 12b of the sheet 12. The sheet 12 is adapted to propagate light rays from the acquisition surface 14 to the outlet 15 by reflection on the first face 12a and the second face 12b, and more precisely by total internal reflection. The first face 12a and the second face 12b constitute interfaces between the sheet 12 and a medium external to the sheet 12 having a second refractive index different from the first refractive index. The interface between the second face 12b and the medium external to the sheet 12 defines a critical angle θc for the rays being propagated in the sheet 12 and incident on this interface.

The sensor also comprises a light source 11 configured to emit a light pulse in the direction of the part of a body placed on the acquisition surface 14. The light pulse is preferably very short, e.g. less than 50 picoseconds, and even more preferably less than 25 picoseconds. The light source 11 is, for example, a laser diode such as a vertical cavity surface-emitting laser (VCSEL) diode. The light source 11 is presented herein as facing the acquisition surface 14, on the side of the second face 12b of the sheet 12. The light source 11 may be arranged elsewhere, and may, e.g., be arranged laterally between the first face 12a and the second face 12b, or also be external to the sheet 12 and directly illuminating the finger without its light passing through the acquisition surface 14.

The sensor also comprises an imager 13 arranged to receive light rays coming from the outlet 15, the imager 13 comprising a matrix of pixels sensitive to the reception of the light rays during an acquisition time.

Conversely to the sensors of the state of the art as shown in FIG. 1, the sensor according to the invention is characterized by a smaller thickness e. More precisely, the thickness e of the sheet 12, i. e. the distance between the first face 12a and the second face 12b, is strictly less than a limit thickness $e_{max}$, where $e_{max}=L/2\times\tan(\theta_c)$, with θc being the critical angle at the interface between the second face 12b and the medium external to the sheet 12.

As a result, a second part of the light rays coming from the acquisition surface 14 is reflected towards said acquisition surface 14 after reflection on the second face 12 during the propagation from the acquisition surface 14 to the outlet 15, while a first part of the light rays 20b, 20c are propagated from the acquisition surface 14 to the outlet 15 without reflection on the acquisition surface 14.

For illustrative purposes, in a cross sectional view as shown in FIG. 2, the acquisition surface 14 extends over the first face 12a in the propagation direction Z from a point A to a point B, point A being the point of the acquisition surface 14 furthest from the outlet 15, point B being the point of the acquisition surface 14 closest to the outlet 15 of the sheet 12. Between points A and B are the points D and C of the acquisition surface 14 (in the propagation direction Z). From each of these points A, B, C, D come light rays (or at least light ray paths which will be considered as light rays for simplicity), denoted respectively 20a, 20b, 20c, 20d.

The light rays 20a, 20b, 20c, 20d coming from the acquisition surface 14 are incident on the second face 12b at an angle of incidence θ greater than the critical angle $\theta_c$, and are reflected back at the same angle θ in order to be propagated next by reflection on the first face 12a and the second face 12b up to the outlet 15. However, because of the small thickness e of the sheet 12, light rays coming from the part of the acquisition surface 14 furthest from the outlet 15 are reflected towards the acquisition surface 14 after a first reflection on the second face 12b. Thus, the ray 20a coming from point A is reflected by the second face 12b in the direction of point C of the acquisition surface 14, while the ray 20d coming from point D is reflected by the second face 12b in the direction of point B of the acquisition surface 14. Conversely, the ray 20b coming from point B and the ray 20c coming from point C are reflected towards the first face 12a outside the acquisition surface 14 after a first reflection on the second face 12b, then propagated towards the outlet 15.

Thus, a second part of the light rays 20a, 20d coming from the acquisition surface 14 is reflected towards the acquisition surface 14 after reflection on the second face 12b during propagation from the acquisition surface 14 to the outlet 15, while a first part of the light rays 20b, 20c is propagated from the acquisition surface 14 to the outlet 15 without reflection on the acquisition surface 14.

It therefore appears, however, that the rays 20a and 20c share the same optical path after the point C, in the sheet 12 and after the latter, such that they reach the same pixel A'/C' of the imager 13. Similarly, the rays 20d and 20b share the same optical path after the point B, in the sheet 12 and after the latter, such that they reach the same pixel B'/D' of the imager 13. The same zone of the imager 13 therefore receives light rays coming from two distinct zones of the acquisition surface 14, since there is an overlap between the light rays coming from the zone A-D and the zone C-B of the acquisition surface 14. A ghost image can then be generated for the zone C-B from the information contained in the light rays coming from the zone A-D. It should be noted that the light rays coming from the zone D-C of the acquisition surface do not present any problem due to the fact that these are propagated from the acquisition surface 14 to the outlet 15 without reflection on the acquisition surface 14 following a first reflection on the second face 12b, and remain distinct from the other light rays up to the imager 13, without risk of confusion.

However, this second part of the light rays does not arrive at the same time on the imager 13. Indeed, the light rays coming from the zone A-D such as the rays 20a and 20d go back and forth in the thickness of the sheet 12 before reaching the acquisition surface 14 from where they follow the same optical path as the light rays coming from the zone C-B. This second part of the light rays therefore has a delay in its propagation in the sheet 12 corresponding to the time taken to go back and forth in the sheet 12, i.e., the path from the acquisition surface 14 to the second face 12b then to the acquisition surface after reflection on the second face 12b. The additional distance is $d_n=2\times e/\cos(\theta)$, traversed by the light at a speed $v_n$ equal to the ratio between the speed of the light c in the vacuum and the refractive index n of the material, which gives an additional travel time of $d_n/v_n$. By way of example, PPMA has an index n of 1.42, and therefore a speed of light $v_n$ inside the sheet 12 of about 211 121 km·s$^{-1}$. With a sheet 12 of a thickness e of 4 mm, and with a PPMA-air critical angle of about 42°, the additional distance $d_n$ is 10.8 mm, hence an additional travel time $\Delta t$ of 51 picoseconds.

Consequently, the second part of the light rays arrives at the imager 13 with a delay corresponding to this additional travel time with respect to the first part of the light rays which has not had any reflection on the acquisition surface 14. It is therefore possible to distinguish the second part of the light rays from the first part of the light rays.

The imager 13 is thus configured to acquire a first image during a first acquisition time corresponding to the reception of the first part of the light rays and a second image during a second acquisition time corresponding to the reception of the second part of the light rays. It is sufficient for that purpose that the first acquisition time stops substantially before the beginning of the reception of the second part of the light rays, and the second acquisition time begins substantially after the end of the reception of the first part of the light rays.

It should be noted that fractions of the second part of the light rays coming from the acquisition surface 14 may have several reflections on the acquisition surface 14. Since each reflection on the acquisition surface 14 generates a propagation delay of the light rays due to going back and forth in the thickness of the sheet 12 as disclosed previously, each fraction of the second part of the light rays is distinguished by a propagation time specific to the number of reflections undergone by said fraction on the acquisition surface 14. It is therefore possible, by acquiring several images, each with an acquisition time dedicated to the reception of the light rays of a fraction, to distinguish the fractions from one another in order to prevent the appearance of ghost images.

However, allowing multiple reflections on the acquisition surface 14 makes the operation of the sensor more complex, and generates additional requirements on the capacities of the imager 13. Thus, the thickness e of the sheet 12 is preferably greater than $e_{min}$, where $e_{min}=L/4\times\tan(\theta_c)$, so as to allow at most only one reflection on the acquisition surface 14 by the light rays of the second part of the light rays.

FIG. 3 and FIG. 4 illustrate an example of operation of the sensor during the implementation of an example of an acquisition method. After the part of a body, typically a finger, of which it is desired to acquire an image of the papillary prints, has been placed on the acquisition surface 14 of the sensor, the light source 11 emits (step S11) a light pulse in the direction of the part of a body placed on the acquisition surface 14. In FIG. 4, this pulse 40 appears on the time profile at the top of the timing diagram.

As explained herein before, this light emission generates light rays coming from the acquisition surface 14 which are propagated in the sheet 12 from the acquisition surface 14 to the outlet 15 and then to the imager 13. These light rays are divided into a first part, which is propagated from the acquisition surface 14 to the outlet 15 without reflection on the acquisition surface 14, and a second part coming from the acquisition surface, which is reflected towards said acquisition surface 14 after reflection on the second face 12 during the propagation from the acquisition surface 14 to the outlet 15. In the temporal profile, in the middle of FIG. 4, schematically showing the light intensity of the rays arriving at the imager 13 as a function of time, the first part of the light rays is depicted by the empty shape 42, while the second part of the light rays is depicted by the hatched shape 44. Herein, it can be seen that the first part of the light rays precedes the second part of the light rays.

The imager 13 then acquires (step S12) a first image during a first acquisition time 46 corresponding to the reception of the first part of the light rays. The first acquisition time 46 is interrupted before the reception of the second part of the light rays. Thus, the first image accounts for the light rays coming from the zone D-B of the acquisition surface 14, since these constitute the first part of the light rays.

The imager 13 then acquires (step S13) a second image during a second acquisition time 48 corresponding to the reception of the second part of the light rays. The first acquisition time 46 begins after the reception of the first part of the light rays. Thus, the second image accounts for the light rays coming from the zone A-D of the acquisition surface 14, since these constitute the second part of the light rays.

It should be noted that the acquisition times 46, 48 may have the same length, or may be of different lengths. The first acquisition time 46 may begin well before the reception of the first part of the light rays and the second acquisition time 48 may be interrupted well after the reception of the second part of the light rays. Nevertheless, the transition between the first acquisition time 46 and the second acquisition time 48 must take place between the reception of the first part of the light rays and the reception of the second part of the light rays. The thinner the sheet 2, the smaller the delay of the second part with respect to the first part. Moreover, the longer the light pulse, the longer the train of light rays of the first part, thus increasing the overlap. It is therefore preferable for the light pulse to be as short as possible, and preferably less than 50 picoseconds, and even more preferably less than 25 picoseconds.

The presence of a temporal overlap on reception by the imager 13 between the first part and the second part of the light rays is not too detrimental. Indeed, the first acquisition time 46 may be interrupted before the end of the reception of the first part of the light rays, so as to avoid the reception of the second part of the light rays. Likewise, the second acquisition time 48 may begin after the beginning of the reception of the second part of the light rays, in order to avoid the end of the reception of the first part of the light rays. There is therefore no acquisition during the time of overlap in reception. It is then possible to reduce the requirement for the light pulse 40 to be short, but at the cost of paying particular attention to the spatial variations in luminosity then generated, since certain zones of the acquisition surface 14 from which the non-acquired light rays originate appear less luminous. Luminosity correction can then be implemented on the final image.

Nevertheless, it is necessary to correctly synchronize the acquisition times of the imager 13 with the arrival of the light rays by means of a calibration. Each image only accounts for a part of the acquisition surface 14, and therefore only accounts for a part of the papillary prints of the part of the body which is affixed thereto. A final step consists therefore of combining (step S14) the first image and the second image to form a final image representative of the papillary prints of the part of the body placed on the acquisition surface. Typically, the combination of the first image and the second image consists of juxtaposing the first image and the second image. Indeed, as explained herein before, the imager 13 receives on the same pixels the light rays coming from zones A-D and C-B. The first image accounts for the light rays coming from the zone D-B, and the second image accounts for the light rays coming from the zone A-D. The juxtaposition of the images makes it possible to account for the zone A-B, creating an offset between the images which avoids superimposing the information coming from the zones A-D and C-B.

The two images are preferably acquired consecutively following the same light pulse. It is then necessary for the imager 13 to have a high acquisition speed. The imager 13 is preferably capable of acquiring the first image and/or the second image with a first acquisition time and/or a second acquisition time of less than 500 picoseconds, and preferably less than 100 picoseconds. For example, it is possible to use an imager based on avalanche photodiodes, and in particular an imager of the single-photon avalanche diode (SPAD) type, which have acquisition speeds that can drop to less than 10 picoseconds. In this type of imager, each electron received (or a small number of electrons) causes a large avalanche current, which allows very fine detection in a very short time.

However, it is possible to use an imager 13 with less speed constraints, by exploiting differently the light rays generated by two distinct light pulses. This is the example illustrated in FIG. 5 and FIG. 6. As previously, the light source 11 emits (step S21) a first light pulse 50 in the direction of the part of a body placed on the acquisition surface 14. In FIG. 6, this first pulse 50 appears on the time profile at the top of the timing diagram. As previously, a train of light rays arrives with a first part of light rays, depicted by the empty shape 52 on the temporal profile in the middle of FIG. 6, followed by a second part of light rays, depicted by the hatched shape 53. As previously, the imager 13 then acquires (step S22) a first image during a first acquisition time 56 (at the bottom of the temporal profile) corresponding to the reception of the first part of the light rays. The first acquisition time 56 is interrupted before the reception of the second part of the light rays.

However, unlike the embodiment illustrated in FIGS. 3 and 4, the acquisition of the second image does not take place at the moment of reception of the second part of the light rays of the same train of light rays generated by the first pulse 50. Before this acquisition, the light source 11 emits (step S23) a second light pulse 51 in the direction of the part of the body placed on the acquisition surface 14, which generates a second train of rays comprising a first part of light rays depicted by the empty shape 54 followed by a second part of light rays represented by the hatched shape 55. The imager 13 then acquires (step S24) a second image during a second acquisition time 58 corresponding to the reception of the second part of the light rays, this time generated by the second pulse 51. This second acquisition time 58 begins after the reception of the first part of the light rays generated by the second pulse 51.

It is easy to choose a gap in time between the first pulse 50 and the second pulse 51 which is sufficiently short for the part of the body not to move between the two acquisitions, typically less than 0.1 second, preferably less than 0.01 second, and much less than the characteristic times of a movement of the body. In this approach, there is no need for the acquisition times 56, 58 to be very close to each other. The imager 13 can therefore be slower. The imager 13 can then be of any type, the only constraint being the synchronization of the end of the first acquisition time 56 before the reception of the second part of the light rays, and the beginning of the second acquisition time 58 after the reception of the first part of the light rays, as previously.

As previously, two images are thus obtained. The first image accounts for the light rays coming from the zone D-B, and the second image accounts for the light rays coming from the zone A-D. As previously, it is therefore sufficient to combine them (step S25) to obtain a final image representative of the papillary prints of the part of the body placed on the acquisition surface 14.

The invention is not limited to the embodiment described and depicted in the attached Figure s. Modifications remain possible, particularly from the viewpoint of the constitution of the various technical characteristics or by substitution of technical equivalents, without departing from the scope of protection of the invention.

The invention claimed is:

1. A papillary print sensor comprising:
    an acquisition surface (14) intended to receive a part of a body from which an image of the papillary prints must be acquired, the acquisition surface (14) extending over a length L in a propagation direction (Z),
    a light source (11) configured to emit a light pulse in the direction of the part of a body placed on the acquisition surface (14),
    a sheet (12) forming a propagation medium for the light in the propagation direction (Z) having a first refractive index, and having at least one outlet (15), a first face (12*a*) and a second face (12*b*) parallel to each other and spaced apart by a thickness (e) of the sheet (12), the sheet (12) being adapted for the propagation of light rays from the acquisition surface (14) to the outlet (15) by reflection on the first face (12*a*) and the second face (12*b*), the second face (12) constituting an interface between the sheet (12) and a medium external to the sheet (12) having a second refractive index different from the first refractive index, said interface defining a critical angle ($\theta_c$) for the rays being propagated in the sheet and incident on this interface,
    an imager (13) arranged to receive the light rays coming from the outlet (15), the imager (13) comprising a matrix of pixels sensitive to the reception of the light rays during an acquisition time,
    characterized in that the thickness (e) of the sheet is strictly less than a limiting thickness $e_{max}$, where $e_{max} = L/2 \times \tan(\theta_c)$, such that in use, a first part of the light rays (20*b*, 20*c*) is propagated from the acquisition surface (14) to the outlet (15) without reflection on the acquisition surface (14) while a second part of the light rays (20*a*, 20*d*) coming from the acquisition surface (14) is reflected towards said acquisition surface (14) after reflection on the second face (12) during the propagation from the acquisition surface (14) to the outlet (15), and in that the imager (13) is configured to acquire a first image during a first acquisition time corresponding to the reception of the first part of the light rays (20b, 20c) and a second image during a second acquisition time corresponding to the reception of the second part of the light rays (20a, 20d).

2. The papillary print sensor according to claim 1, wherein the first acquisition time stops before the beginning of the reception of the second part of the light rays, and the second acquisition time begins after the end of the reception of the first part of the light rays.

3. The papillary print sensor according to claim 1, wherein the first acquisition time begins before the beginning of the reception of the first part of the light rays and the second acquisition time begins after the end of the reception of the second part of the light rays.

4. The papillary print sensor according to claim 1, in which the thickness (e) of the sheet (12) is greater than $e_{min}$, where $e_{min} = L/4 \times \tan(\theta_c)$.

5. The papillary print sensor according to claim 1, wherein at least one acquisition time between the first acquisition time and the second acquisition time is less than 500 picoseconds.

6. The papillary print sensor according to claim 1, wherein the imager (13) is an avalanche photodiode imager.

7. The papillary print sensor according to claim 1, wherein the light pulse is less than 50 picoseconds.

8. A method for acquiring papillary prints of a part of a body placed on an acquisition surface (14) of a papillary print sensor according to claim 1, the method comprising the following steps:

emission by the light source (11) of a light pulse in the direction of the part of a body placed on the acquisition surface (14), acquisition by the imager (13) of a first image during a first acquisition time corresponding to the reception of the first part of the light rays, said first part of the light rays (20b, 20c) propagating from the acquisition surface (14) to the outlet (15) without reflection on the acquisition surface (14), acquisition by the imager (13) of a second image during a second acquisition time corresponding to the reception of the second part of the light rays, said second part of the light rays (20a, 20d) coming from the acquisition surface (14) being reflected towards said acquisition surface (14) after reflection on the second face (12) during the propagation from the acquisition surface (14) to the outlet (15), combination of the first image and the second image to form a final image representative of the papillary prints of the part of the body placed on the acquisition surface.

9. The method according to claim 8, wherein the combination of the first image and the second image consists of juxtaposing the first image and the second image.

10. The method according to claim 8, further comprising an emission by the light source (11) of a second light pulse in the direction of the part of a body placed on the acquisition surface (14) after the imager (13) has acquired a first image and before the imager (13) has acquired a second image.

* * * * *